United States Patent
Yamaoka et al.

(10) Patent No.: US 12,151,686 B2
(45) Date of Patent: *Nov. 26, 2024

(54) INFORMATION PROVISION SYSTEM, INFORMATION TERMINAL, AND INFORMATION PROVISION METHOD

(71) Applicant: HONDA MOTOR CO., LTD., Tokyo (JP)

(72) Inventors: Daisuke Yamaoka, Wako (JP); Yu Takiguchi, Wako (JP); Kazuhiko Tanaka, Tokyo (JP); Hitomi Hamamura, Wako (JP); Taku Aoki, Wako (JP); Takuya Ishii, Wako (JP); Hideki Kazami, Wako (JP); Taisuke Kotani, Wako (JP); Makoto Terada, Wako (JP); Kunio Nakakita, Wako (JP); Hironao Ito, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 317 days.

This patent is subject to a terminal disclaimer.

(21) Appl. No.: 17/590,163

(22) Filed: Feb. 1, 2022

(65) Prior Publication Data

US 2022/0153281 A1 May 19, 2022

Related U.S. Application Data

(63) Continuation of application No. PCT/JP2019/031967, filed on Aug. 14, 2019.

(51) Int. Cl.
*B60W 40/09* (2012.01)
*B60W 40/08* (2012.01)
*G06V 20/58* (2022.01)

(52) U.S. Cl.
CPC .............. *B60W 40/09* (2013.01); *G06V 20/58* (2022.01); *B60W 2040/0872* (2013.01); *B60W 2420/403* (2013.01)

(58) Field of Classification Search
CPC ............. B60S 5/00; B60W 2040/0872; B60W 2420/403; B60W 40/09; G06Q 50/10;
(Continued)

(56) References Cited

U.S. PATENT DOCUMENTS 7,363,129 B1 * 4/2008 Barnicle ................ G08C 17/02
    701/1
9,809,159 B1 * 11/2017 Snyder .................. B60W 40/09
(Continued)

FOREIGN PATENT DOCUMENTS

CN     101429721 A     5/2009
CN     106210388 A    12/2016
(Continued)

OTHER PUBLICATIONS

International Search Report dated Sep. 17, 2019, issued in counterpart International Application No. PCT/JP2019/031967, w/English Translation. (5 pages).
(Continued)

*Primary Examiner* — Babar Sarwar
(74) *Attorney, Agent, or Firm* — WHDA, LLP

(57) ABSTRACT

The present invention provides an information provision system that provides a user with information for coping with a problem by using an information terminal having a camera and a display, wherein the information terminal includes at least one processor with a memory comprising instructions cause the at least one processor to at least: identify a problem area in a captured image obtained by the camera; and display, on the display, a plurality of procedure screens indicating contents of a procedure for coping with the
(Continued)

identified problem area, in accordance with an answer from the user, the plurality of procedure screens include a first procedure screen on which a plurality of answer items selectable by the user are displayed.

13 Claims, 14 Drawing Sheets

(58) Field of Classification Search
CPC ........ G06V 10/17; G06V 20/58; G06V 20/59; G06V 2201/02
See application file for complete search history.

(56) References Cited

U.S. PATENT DOCUMENTS

| | | | | |
|---|---|---|---|---|
| 9,832,241 | B1* | 11/2017 | Hayward | G01C 21/3667 |
| 10,002,473 | B1* | 6/2018 | Leise | G07C 5/0825 |
| 10,049,505 | B1* | 8/2018 | Harvey | B60R 16/0234 |
| 10,946,862 | B1* | 3/2021 | Bischoff | G06Q 30/0645 |
| 11,279,204 | B2* | 3/2022 | Youn | B60H 1/00821 |
| 11,494,940 | B1* | 11/2022 | Gingrich | G06T 7/74 |
| 2007/0093947 | A1* | 4/2007 | Gould | G07C 5/008 |
| | | | | 701/31.5 |
| 2013/0046592 | A1* | 2/2013 | Ross | G06F 3/0346 |
| | | | | 715/810 |
| 2014/0195099 | A1* | 7/2014 | Chen | G06F 16/248 |
| | | | | 701/29.6 |
| 2014/0240349 | A1* | 8/2014 | Tuukkanen | G06F 3/0484 |
| | | | | 345/633 |
| 2015/0199619 | A1* | 7/2015 | Ichinose | G06Q 10/02 |
| | | | | 705/5 |
| 2016/0117732 | A1* | 4/2016 | Zou | G06Q 30/0256 |
| | | | | 705/14.54 |
| 2016/0349860 | A1 | 12/2016 | Wagatsuma et al. | |
| 2018/0257659 | A1* | 9/2018 | Nguyen | G07C 5/0816 |
| 2020/0410781 | A1* | 12/2020 | Saini | G07C 5/008 |
| 2021/0078571 | A1* | 3/2021 | Zhu | H04W 12/03 |
| 2021/0335063 | A1* | 10/2021 | Collins | G07C 5/006 |
| 2021/0394766 | A1* | 12/2021 | Crawford | B60W 50/087 |

FOREIGN PATENT DOCUMENTS

| | | | | |
|---|---|---|---|---|
| CN | 106384095 | A * | 2/2017 | ......... G06F 16/583 |
| CN | 109726330 | A | 5/2019 | |
| JP | 2004-114891 | A | 4/2004 | |
| JP | 2013-228897 | A | 11/2013 | |
| JP | 2016-173691 | A | 9/2016 | |
| JP | 2017-162404 | A | 9/2017 | |
| JP | 2018-81425 | A | 5/2018 | |
| JP | 6380169 | B2 | 8/2018 | |
| JP | 2018-160175 | A | 10/2018 | |
| WO | WO-2018102440 | A1 * | 6/2018 | ......... G06K 9/00979 |

OTHER PUBLICATIONS

Office Action dated Aug. 27, 2024, issued in counterpart CN Application No. 201980098918.5, with English translation. (16 pages).

* cited by examiner

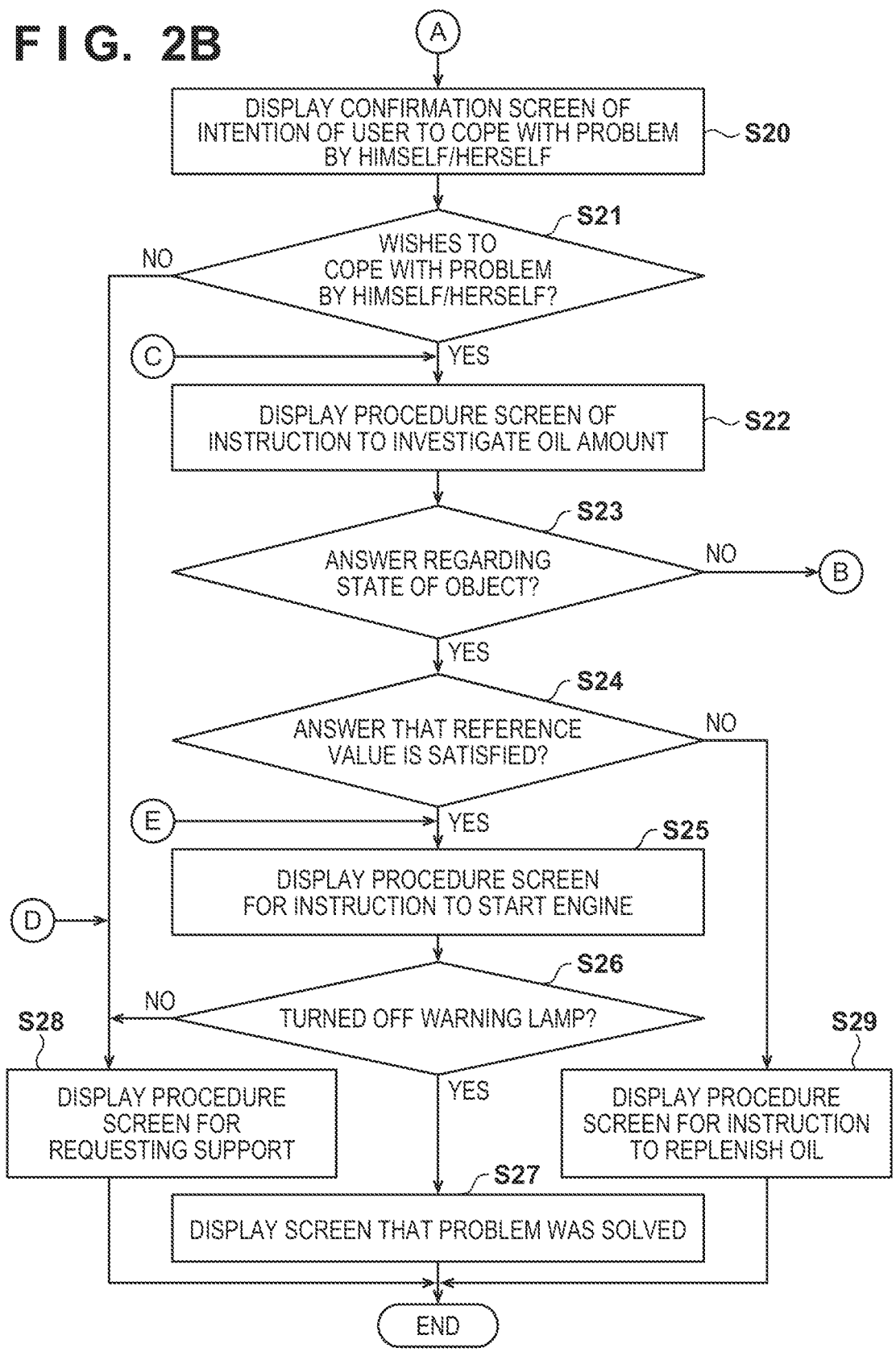

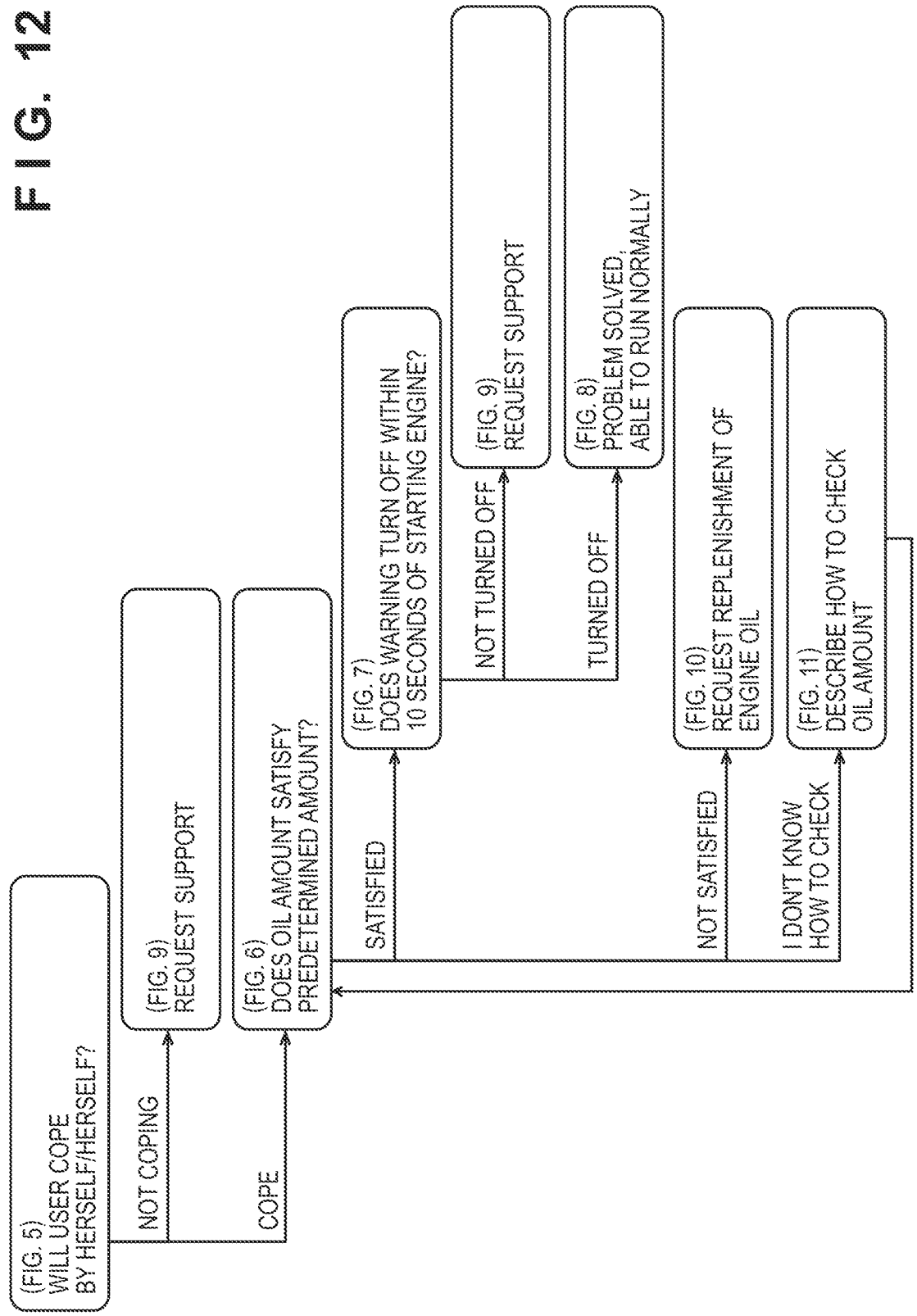

INFORMATION PROVISION SYSTEM, INFORMATION TERMINAL, AND INFORMATION PROVISION METHOD

CROSS-REFERENCE TO RELATED APPLICATIONS

This application is a continuation of International Patent Application No. PCT/JP2019/031967 filed on Aug. 14, 2019, the entire disclosures of which are incorporated herein by reference.

BACKGROUND OF THE INVENTION

Field of the Invention

The present invention relates to an information provision system, an information terminal, and an information provision method for providing a user with information for coping with a problem.

In a case where a problem such as a failure occurs in a vehicle or the like, it is preferable to allow the user to grasp what kind of problem has occurred or what kind of measure should be taken against the problem. For example, Patent Literature 1 discloses a method for performing a failure diagnosis of a vehicle on the basis of diagnostic data collected using a sensor provided in a terminal device and a decision tree model in which a plurality of question items and a plurality of request items are represented in a tree-like hierarchical structure.

In the method described in Patent Literature 1, only the state of the diagnosis target (vehicle) is unilaterally asked, and for example, the state of the user such that the comprehension level of the user regarding a question is low or the user has no intention to cope with a problem is not considered. That is, in the method described in Patent Literature 1, it may be difficult for some users to answer question items, and appropriate provision of information to individual users is insufficient.

Therefore, an object of the present invention is to appropriately provide a user with information for coping with a problem.

CITATION LIST

Patent Literature

PTL 1: Japanese Patent No. 6380169

SUMMARY OF THE INVENTION

According to the present invention, there is provided an information provision system that provides a user with information for coping with a problem by using an information terminal having a camera and a display, wherein the information terminal includes at least one processor with a memory comprising instructions, that when executed by the at least one processor, cause the at least one processor to at least: identify a problem area in a captured image obtained by the camera; and display, on the display, a plurality of procedure screens indicating contents of a procedure for coping with the identified problem area, in accordance with an answer from the user, the plurality of procedure screens include a first procedure screen on which a plurality of answer items selectable by the user are displayed as answers to the procedure, and the plurality of answer items include an answer item regarding a state of an object and an answer item regarding a state of the user.

Further features of the present invention will become apparent from the following description of exemplary embodiments with reference to the attached drawings.

BRIEF DESCRIPTION OF THE DRAWINGS

FIG. 2B is a flowchart illustrating processing of providing coping information of a problem area.

FIG. 12 is a diagram illustrating a display control flow of a plurality of procedure screens.

DESCRIPTION OF EMBODIMENTS

Figure 1:
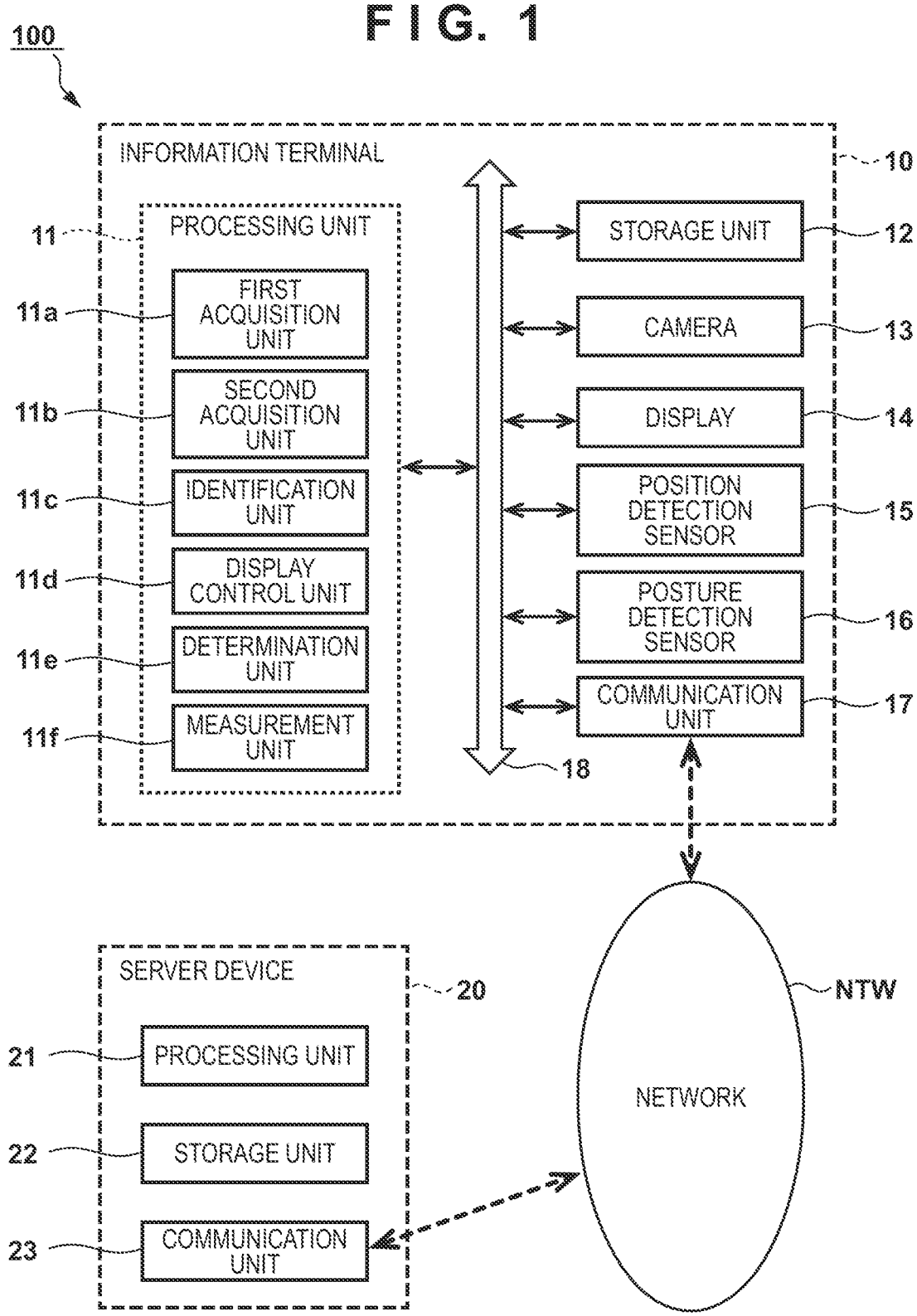
FIG. 1 is a block diagram illustrating the configuration of an information provision system.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

First Embodiment

An information provision system 100 of a first embodiment according to the present invention will be described. Although an example in which the information provision system 100 is applied to a vehicle will be described in the present embodiment, the present invention is not limited thereto, and the information provision system 100 of the present embodiment can also be applied to a device other than a vehicle. Examples of the vehicle include a four-wheeled vehicle, a straddle type vehicle (two-wheeled vehicle, three-wheeled vehicle), a ship, an aircraft, a lawn mower, and a snow blower. In the present embodiment, a four-wheeled vehicle will be described as an illustration of the vehicle.

[Configuration Example of Information Provision System]

FIG. 1 is a block diagram illustrating the configuration of the information provision system 100 of the present embodiment. The information provision system 100 of the present embodiment includes an information terminal 10 and a server device 20 (cloud) communicably connected with each other via, for example, a network NTW, and is a system for providing a user with information for coping with a problem such as a failure of a vehicle or lighting of a warning lamp, for example.

First, the configuration of the information terminal 10 will be described. The information terminal 10 can include, for example, a processing unit 11, a storage unit 12, a camera 13, a display 14, a position detection sensor 15, a posture detection sensor 16, and a communication unit 17. The units of the information terminal 10 are communicably connected with each other via a system bus 18. Examples of the information terminal 10 include a smartphone and a tablet terminal. In the present embodiment, an example in which a smartphone is used as the information terminal 10 will be described. A smartphone and a tablet terminal are mobile terminals having various functions in addition to a call function, and are different from each other in display size. The display size of the tablet terminal is generally larger than that of the smartphone.

The processing unit 11 includes a processor represented by a CPU, a storage device such as a semiconductor memory, an interface with an external device, and the like. The storage unit 12 stores a program to be executed by the processor, data to be used for processing by the processor, and the like. The processing unit 11 can read the program stored in the storage unit 12 to the storage device such as a memory and execute the program. In the present embodiment, the storage unit 12 stores an application program (information provision program) for providing a user with information for coping with a problem, and the processing unit 11 can read the information provision program stored in the storage unit 12 to the storage device such as a memory and execute the information provision program.

The camera 13 has a lens and an imaging element, and photographs a subject to acquire a captured image. The camera 13 can be provided on, for example, an outer surface opposite to an outer surface on which the display 14 is provided. Moreover, the display 14 displays an image to notify the user of information. In the present embodiment, the display 14 can display the captured image acquired by the camera 13 in real time. Here, the display 14 of the present embodiment includes, for example, a touchscreen liquid crystal display (LCD) or the like, and therefore has not only a function of displaying an image but also a function of accepting input of information by the user. However, the present invention is not limited thereto. The display 14 may have only a function of displaying an image, and an input unit (e.g., a keyboard, a mouse, etc.) may be provided independently of the display 14.

The position detection sensor 15 detects the position and orientation of the information terminal 10. The position detection sensor 15 can include, for example, a GPS sensor that receives a signal from a GPS satellite to acquire the current position of the information terminal 10, an orientation sensor that detects an orientation in which the camera 13 of the information terminal 10 is directed on the basis of geomagnetism or the like, or the like. In the present embodiment, the description of the "position of the information terminal 10" includes not only the current position of the information terminal 10 but also the orientation of the information terminal 10. Moreover, the posture detection sensor 16 detects the posture of the information terminal 10. The posture detection sensor 16 can include, for example, an acceleration sensor, a gyro sensor, or the like.

The communication unit 17 is communicably connected with the server device 20 via the network NTW. Specifically, the communication unit 17 has a function as a reception unit that receives information from the server device 20 via the network NTW, and a function as a transmission unit that transmits information to the server device 20 via the network NTW.

As a specific configuration of the processing unit 11, a first acquisition unit 11a, a second acquisition unit 11b, an identification unit 11c, a display control unit 11d, a determination unit 11e, and a measurement unit 11f can be provided, for example. The first acquisition unit 11a acquires data of a captured image obtained by the camera 13. The second acquisition unit 11b acquires information or data from the server device 20 via the communication unit 17. The identification unit 11c performs image processing such as pattern matching, for example, to analyze the captured image, and identifies the problem area in the captured image displayed on the display 14. The display control unit 11d controls display of the captured image obtained by the first acquisition unit 11a on the display 14, and controls display of a confirmation screen or a procedure screen to be described later on the display 14. The determination unit 11e makes a determination regarding a procedure for coping with the problem area on the basis of the captured image obtained by the camera 13. The measurement unit 11f measures a time required to cope with the problem area.

Next, the configuration of the server device 20 will be described. The server device 20 can include a processing unit 21, a storage unit 22, and a communication unit 23. The processing unit 21 includes a processor represented by a CPU, a storage device such as a semiconductor memory, an interface with an external device, and the like. The storage unit 22 stores a program to be executed by a processor, data to be used by the processor for processing, and the like, and the processing unit 21 can read the program stored in the storage unit 22 to a storage device such as a memory to execute the program. Moreover, the communication unit 23 is communicably connected with the information terminal 10 via the network NTW. Specifically, the communication unit 23 has a function as a reception unit that receives information from the information terminal 10 via the network NTW, and a function as a transmission unit that transmits information to the information terminal 10 via the network NTW.

In the case of the present embodiment, the server device 20 (storage unit 22) stores information (which may be hereinafter referred to as coping information) for coping with each of various problems that occur in the vehicle. The coping information includes a plurality of procedure screens indicating the contents of a procedure for coping with a problem. Moreover, the plurality of procedure screens are configured in a tree-like hierarchical structure, for example, and are suitably displayed on the display 14 in accordance with an answer from the user. Specifically, each of the plurality of procedure screens includes a plurality of answer items selectable by the user as answers to the content of the procedure, and a next procedure screen associated with an answer item selected by the user is displayed on the display 14.

[Processing in Information Terminal]

Figure 2A:
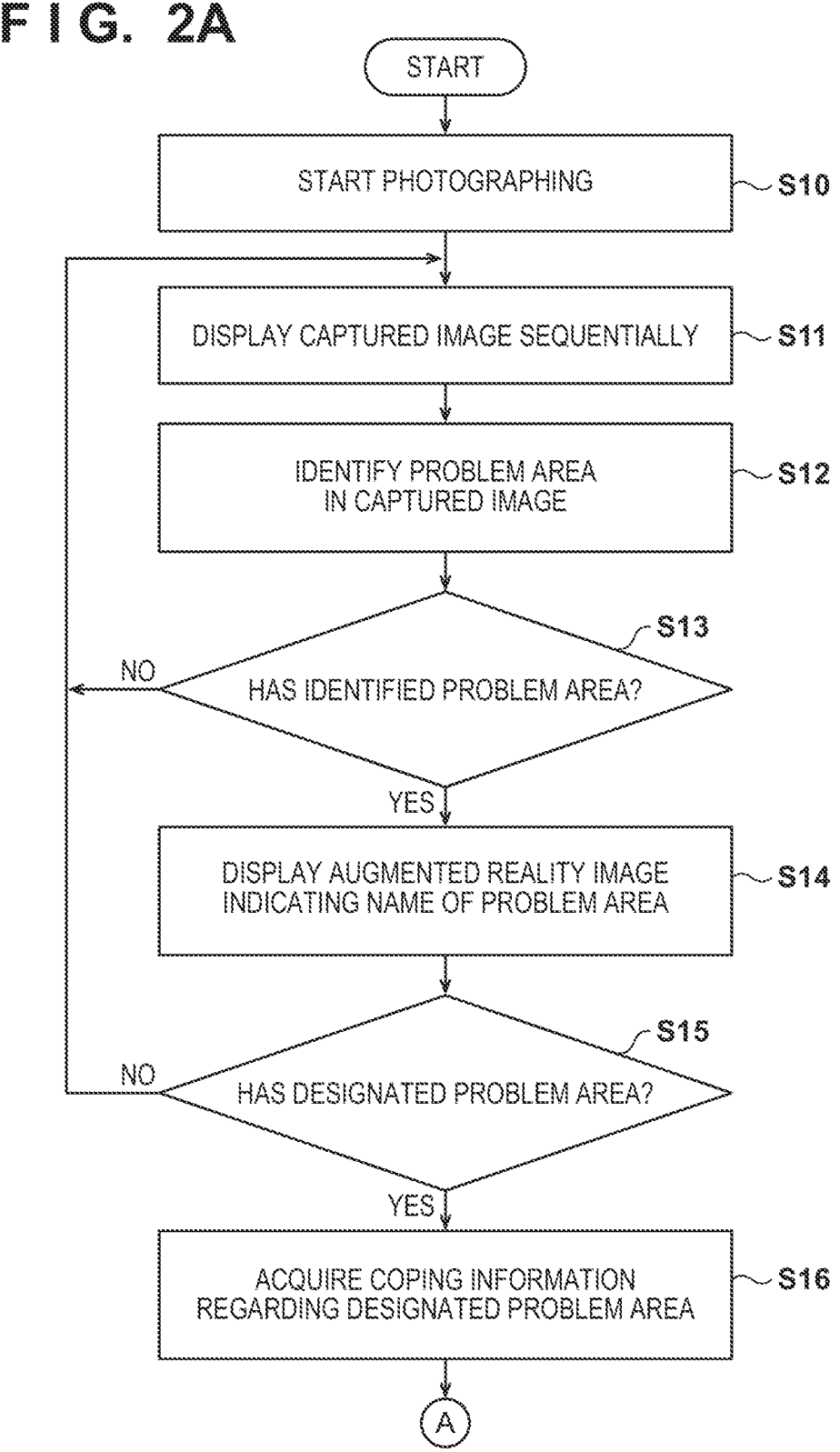
FIG. 2A is a flowchart illustrating processing of identifying a problem area.
Figure 2C:
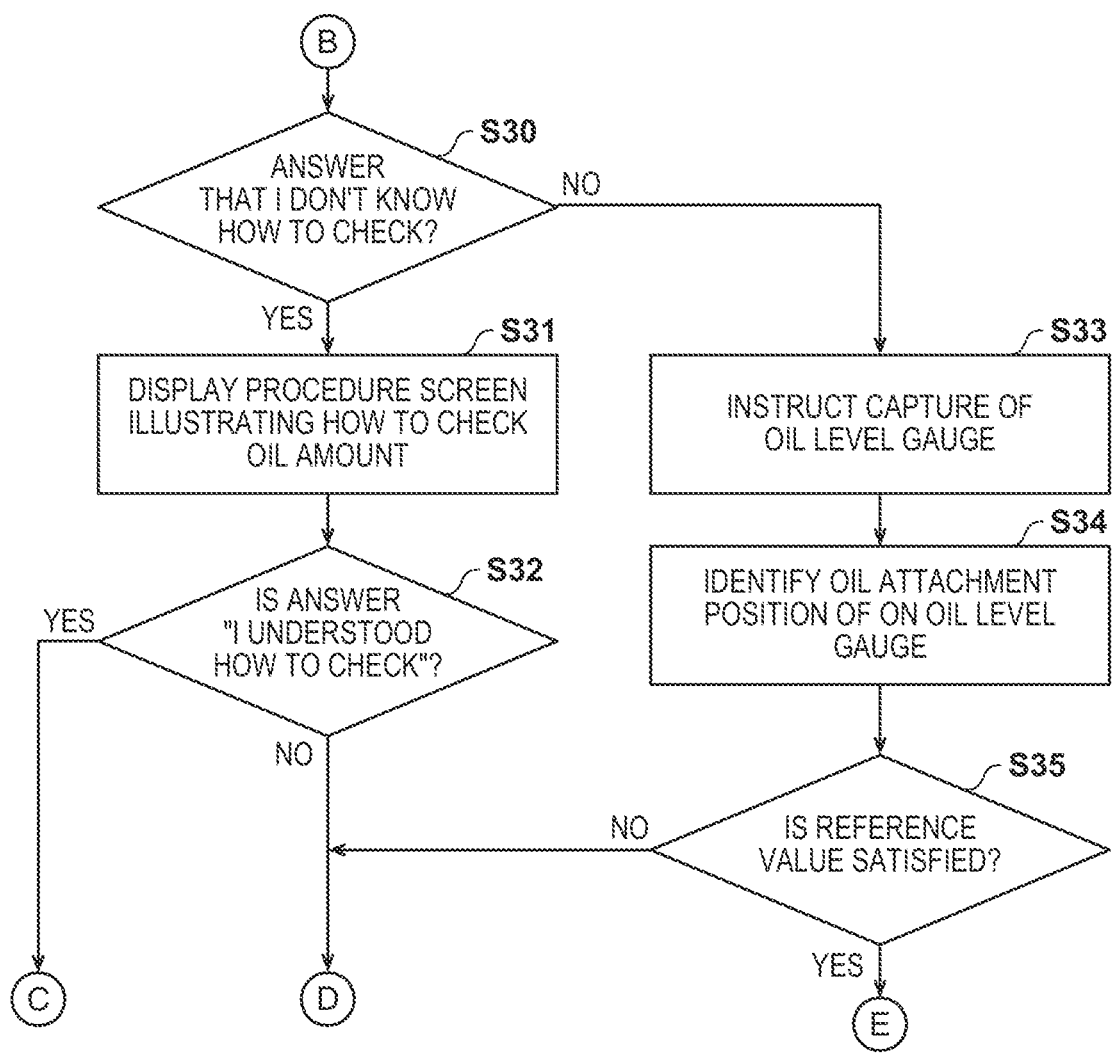
FIG. 2C is a flowchart illustrating processing of providing coping information of a problem area.

Next, processing to be performed by the information terminal 10 when the information provision program is executed will be described. FIGS. 2A to 2C are flowcharts illustrating processing to be performed by the processing unit 11 of the information terminal 10. FIG. 2A is a flowchart illustrating processing of identifying a problem area (target area in which a problem occurs), and FIGS. 2B and 2C are flowcharts illustrating processing of providing the user with coping information (a plurality of procedure screens) regarding the problem area.

Here, the problem area may include at least one of an article in an abnormal state different from a normal state, or a notification sign indicating that the article is in an abnormal state. Examples of the "article" include a vehicle itself and a part of a vehicle, and examples of the "abnormal state" include a failure and a damage. Moreover, examples of the "notification sign" include lighting/blinking of a warning lamp such as a hydraulic warning lamp or an engine warning lamp, and an abnormal sound or a warning sound.

First, processing of identifying a problem area will be described with reference to a flowchart illustrated in FIG. 2A. Each step of the flowchart in FIG. 2A can be performed by the processing unit 11. Moreover, FIGS. 3 and 4 can be used to describe each step of the flowchart illustrated in FIG. 2A.

Figure 3:
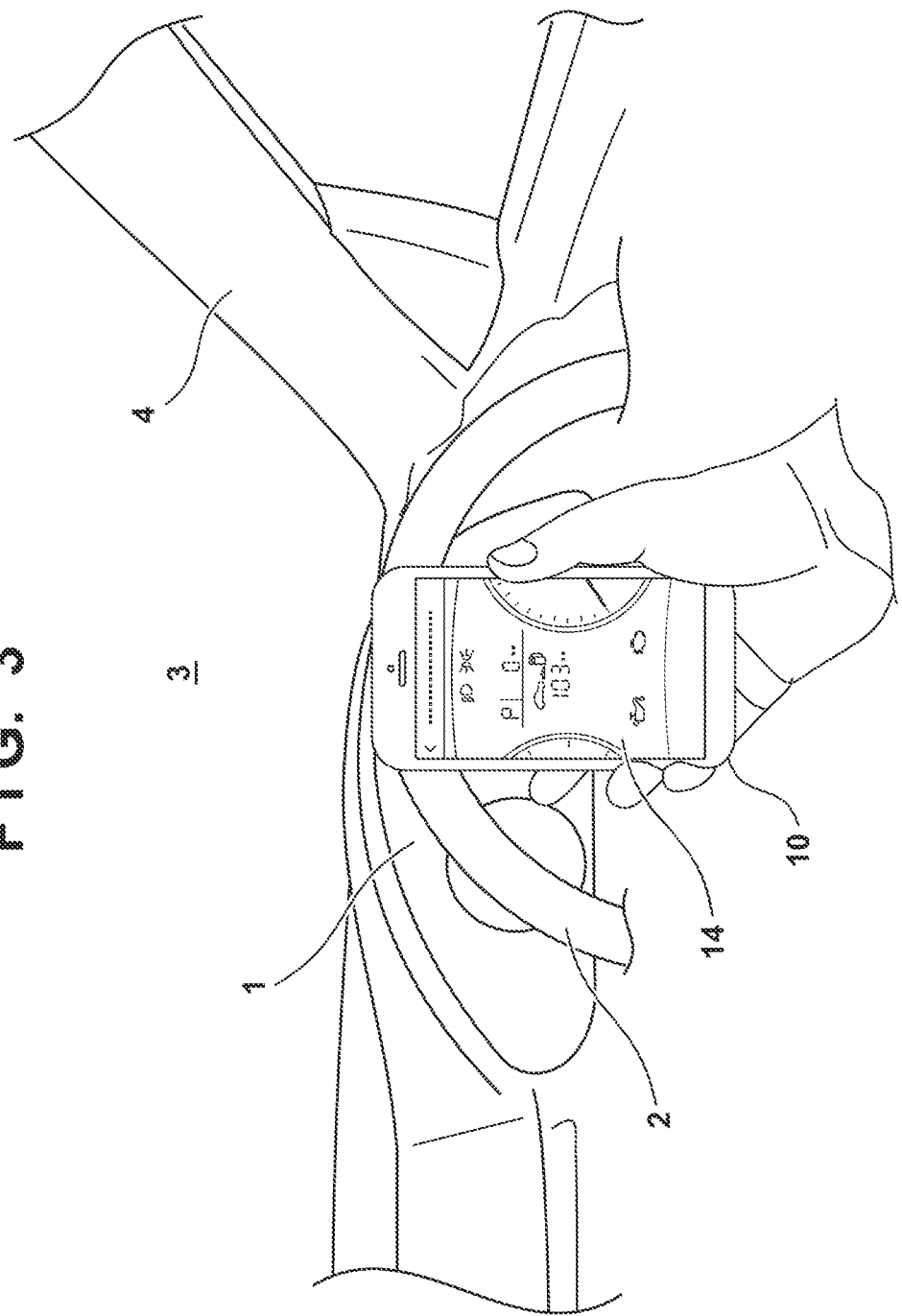
FIG. 3 is a view illustrating a situation in which a meter panel in a vehicle is photographed.

In S10, the processing unit 11 (first acquisition unit 11a) causes the camera 13 to start photographing, and acquires a captured image from the camera 13. In S11, the processing unit 11 (display control unit 11d) sequentially displays captured images acquired from the camera 13 on the display 14. For example, FIG. 3 illustrates a situation in which the camera 13 of the information terminal 10 photographs a meter panel 1 in the vehicle. In this case, in the information terminal 10, the captured images of the meter panel 1 obtained by the camera 13 are sequentially displayed on the display 14. Note that FIG. 3 illustrates a vehicle interior environment seen by the user, and illustrates the meter panel 1, a steering wheel 2, a windshield 3, and a right front pillar 4.

In S12, the processing unit 11 (identification unit 11c) identifies a problem area in a captured image displayed on the display 14. For example, the processing unit 11 can determine which part of the vehicle is photographed by the camera 13 to obtain the captured image, by performing known image processing. An example of the known image processing is a method of detecting, in the captured image, a part (feature point) having a feature value such as a corner, curvature, change in brightness, or change in color, and recognizing a part (photographed part) of the vehicle photographed by the camera 13 from feature information indicating the feature value, positional relationship, or the like of the detected feature point. Moreover, the server device 20 (storage unit 22) stores an image of the vehicle (e.g., the inside of the vehicle) in a normal state in which no problem (abnormality) has occurred. The processing unit 11 acquires an image of the vehicle in the normal state corresponding to the recognized photographed part from the server device 20, and compares the captured image obtained by the camera 13 with the image of the vehicle in the normal state so as to identify an area where a difference occurs in the images as a problem area.

Here, although the processing of identifying the problem area is performed by the processing unit 11 (identification unit 11c) of the information terminal 10 in the present embodiment, the processing may be performed by the processing unit 21 of the server device 20. In this case, the processing unit 11 of the information terminal 10 sequentially transmits the captured images obtained by the camera 13 to the server device 20 via the communication unit 17. The processing unit 21 of the server device 20 compares a captured image received from the information terminal 10 with the image of the vehicle in the normal state to identify a problem area, and transmits information indicating the identified problem area to the information terminal 10 via the communication unit 23.

In S13, the processing unit 11 determines whether a problem area has been identified in the captured image displayed on the display 14 or not. The processing proceeds to S14 in a case where a problem area has been identified in the captured image, or returns to S11 in a case where no problem area has been identified in the captured image.

In S14, the processing unit 11 (display control unit 11d) displays an augmented reality (AR) image indicating the name of the problem area over a captured image obtained by the camera 13 on the display 14 as a designation button for the user to designate the problem area identified in S12. At this time, the processing unit 11 displays the augmented reality image serving as a designation button on the display so that the augmented reality image is aligned with the position of the problem area in the captured image detected by the position detection sensor 15 and the posture detection sensor 16.

Figure 4:
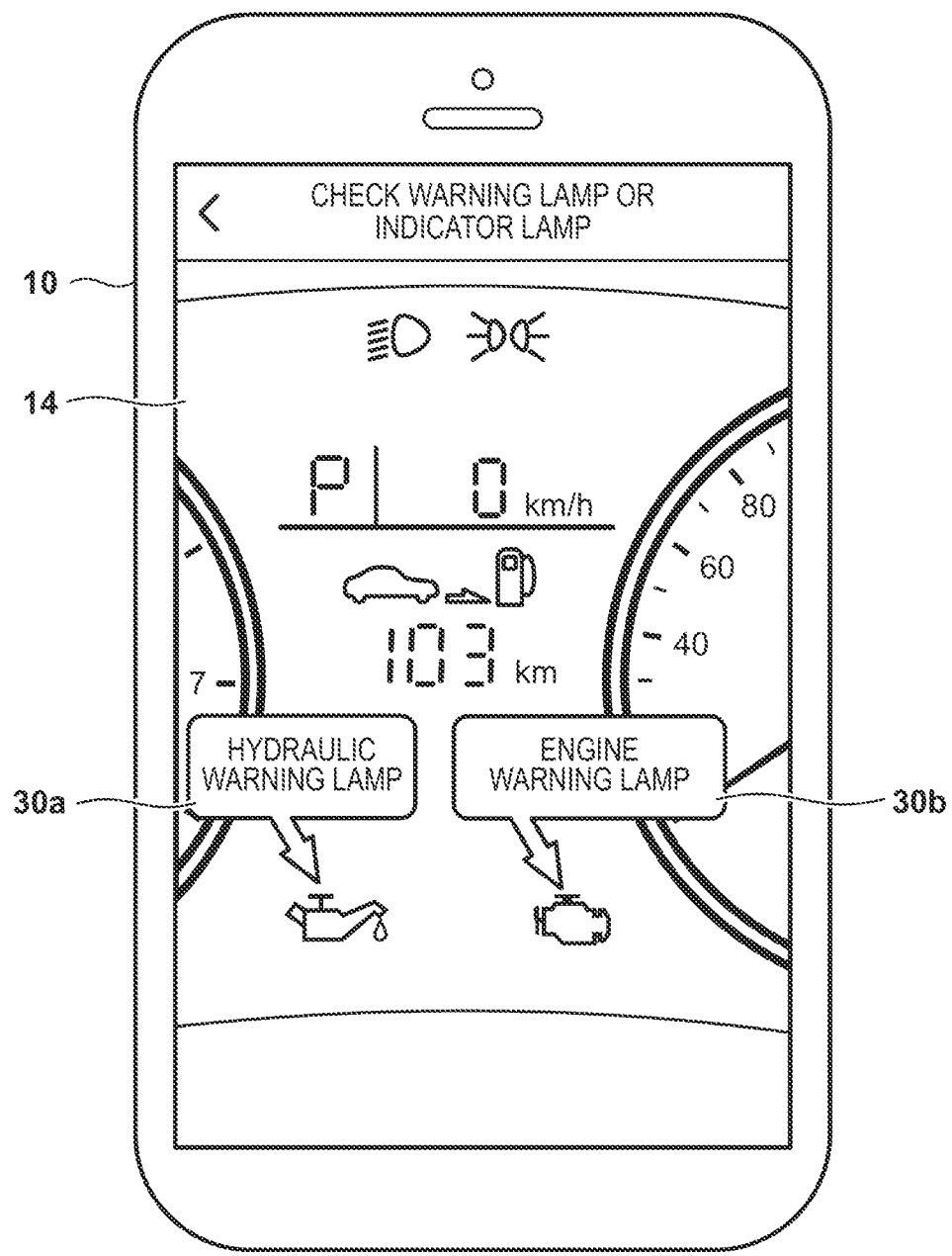
FIG. 4 is a diagram illustrating an example of displaying an augmented reality image over a captured image.

For example, assume that a hydraulic warning lamp and an engine warning lamp are lighted in the meter panel. In this case, the processing unit 11 identifies the lighting of the hydraulic warning lamp and the engine warning lamp as problem areas (S12), and displays augmented reality images indicating the names of the hydraulic warning lamp and the engine warning lamp over the captured image on the display 14 as designation buttons (S14). FIG. 4 illustrates an example in which augmented reality images 30a and 30b indicating the names of the hydraulic warning lamp and the engine warning lamp are displayed over the captured image on the display 14 as designation buttons. As a result, the user can designate a problem area that he/she wants to cope with, by touching one of the augmented reality images 30a and 30b functioning as designation buttons on the display 14. A case where the user touches the augmented reality image 30a indicating the name of the hydraulic warning lamp and designates lighting of the hydraulic warning lamp will be described below.

In S15, the processing unit 11 determines whether the user has designated a problem area he/she wants to cope with or not. The processing proceeds to S16 in a case where the user has designated a problem area, or returns to S11 in a case where no problem area has been designated. In S16, the processing unit 11 acquires coping information regarding the problem area designated by the user in S15 from the server device 20. In the case of the present embodiment, the coping information acquired from the server device 20 in S16 can include data of a confirmation screen for confirming the intention of the user to cope with the problem area by himself/herself, and data of a plurality of procedure screens indicating the contents of procedures for coping with the problem area. Here, although the coping information regarding the problem area is stored in the server device 20 and is acquired from the server device 20 by communication with the server device 20 in the present embodiment, the present invention is not limited thereto. For example, coping information regarding a problem area may be stored in the storage unit 12 of the information terminal 10 in advance, so that the coping information is acquired from the storage unit 12.

Next, processing of providing the user with the coping information regarding a problem area will be described with reference to the flowcharts illustrated in FIGS. 2B and 2C. Each step of the flowchart illustrated in FIG. 2B can be performed by the processing unit 11. Moreover, FIGS. 5 to 11 are diagrams illustrating display screens to be displayed on the display 14 of the information terminal 10 in the flowcharts of FIGS. 2B and 2C. As illustrated in FIG. 12, the display screens illustrated in FIGS. 5 to 11 are configured in a tree-like hierarchical structure indicating the contents of procedures for coping with lighting of the hydraulic warning lamp, and are suitably displayed on the display 14 in accordance with an answer from the user. Here, although processing of providing the user with information for coping with lighting of the hydraulic warning lamp will be described in the present embodiment as an example, similar processing can be performed for a problem area other than lighting of the hydraulic warning lamp. In a case of coping with a problem area other than lighting of the hydraulic warning lamp, the contents of the coping information (i.e., the contents of the confirmation screen and the plurality of procedure screens) or the configuration of the flowchart may be sequentially changed.

Figure 5:
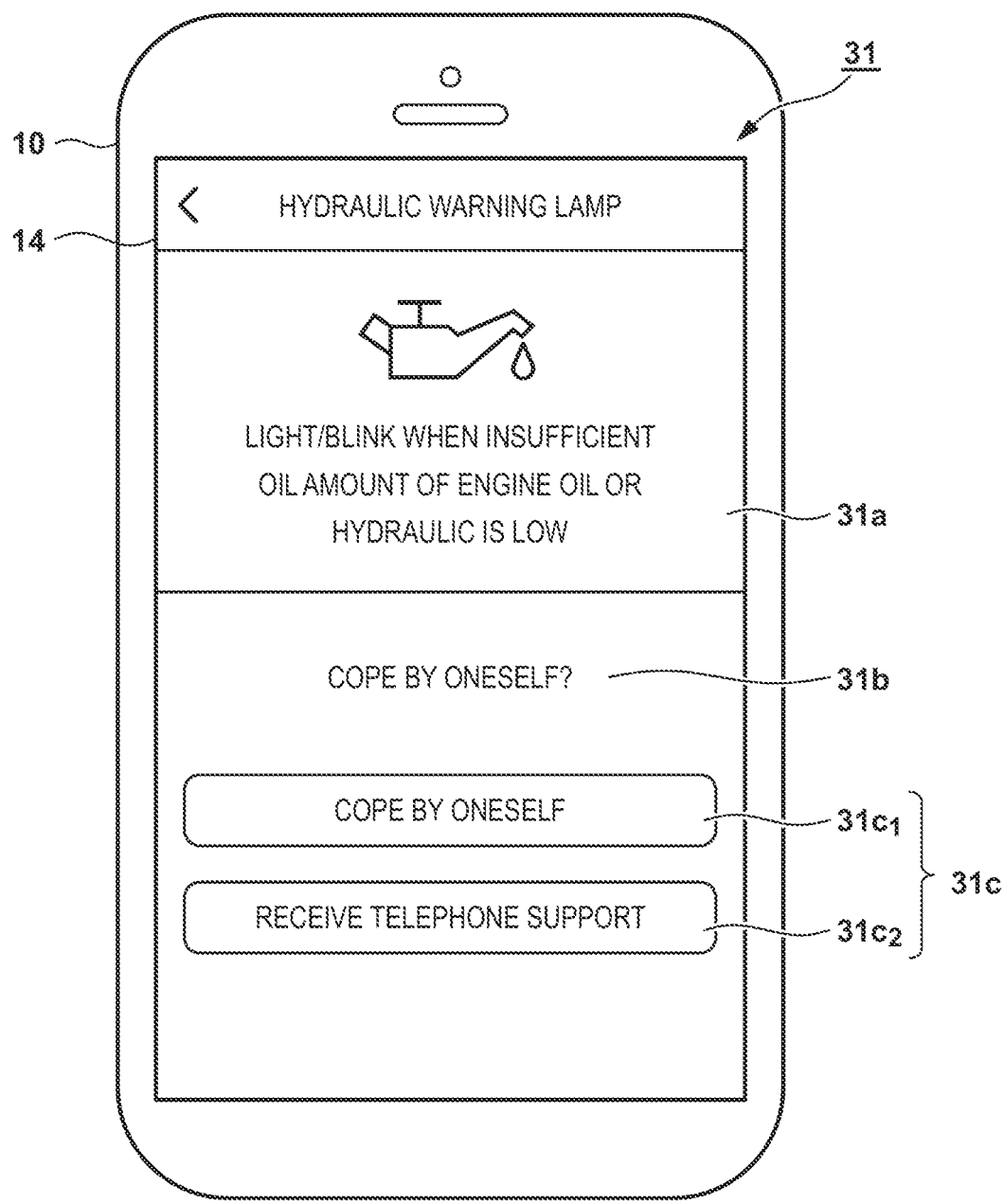
FIG. 5 is a diagram illustrating a confirmation screen for confirming the intention of a user to cope by himself/herself.

In S20, the processing unit 11 (display control unit 11d) displays a confirmation screen 31 for confirming whether the user has an intention to cope with the problem area by himself/herself or not to the user on the display 14. FIG. 5 is a diagram illustrating an example in which the confirmation screen 31 for confirming the intention of the user to cope by himself/herself is displayed on the display 14 of the information terminal 10. The confirmation screen 31 can include, for example, a description field 31a of a hydraulic warning lamp, a question comment 31b as to whether to cope by himself/herself or not, and a plurality of answer items 31c. The plurality of answer items 31c are configured with selection buttons selectable by the user, and the user can answer the question by touching any one of the plurality of answer items 31c on the display. In the example illustrated in FIG. 5, an answer item 31c1 of "cope by myself" and an answer item 31c2 of "receive telephone support" are provided.

In S21, the processing unit 11 determines whether the user has an intention to cope with the problem area by himself/herself or not. In a case where the answer item 31c1 of "cope by myself" is touched on the confirmation screen 31, it is determined that the user has an intention to cope by himself/herself, and the processing proceeds to S22. On the other hand, in a case where the answer item 31c2 of "receive telephone support" is touched on the confirmation screen, it is determined that the user has no intention to cope by himself/herself, and the processing proceeds to S28. In a case where it is confirmed on the confirmation screen 31 that the user has an intention to cope by himself/herself, the number of procedure screens suitably displayed on the display 14 becomes larger than that in a case where it is confirmed that the user has no intention to cope by himself/herself.

Figure 6:
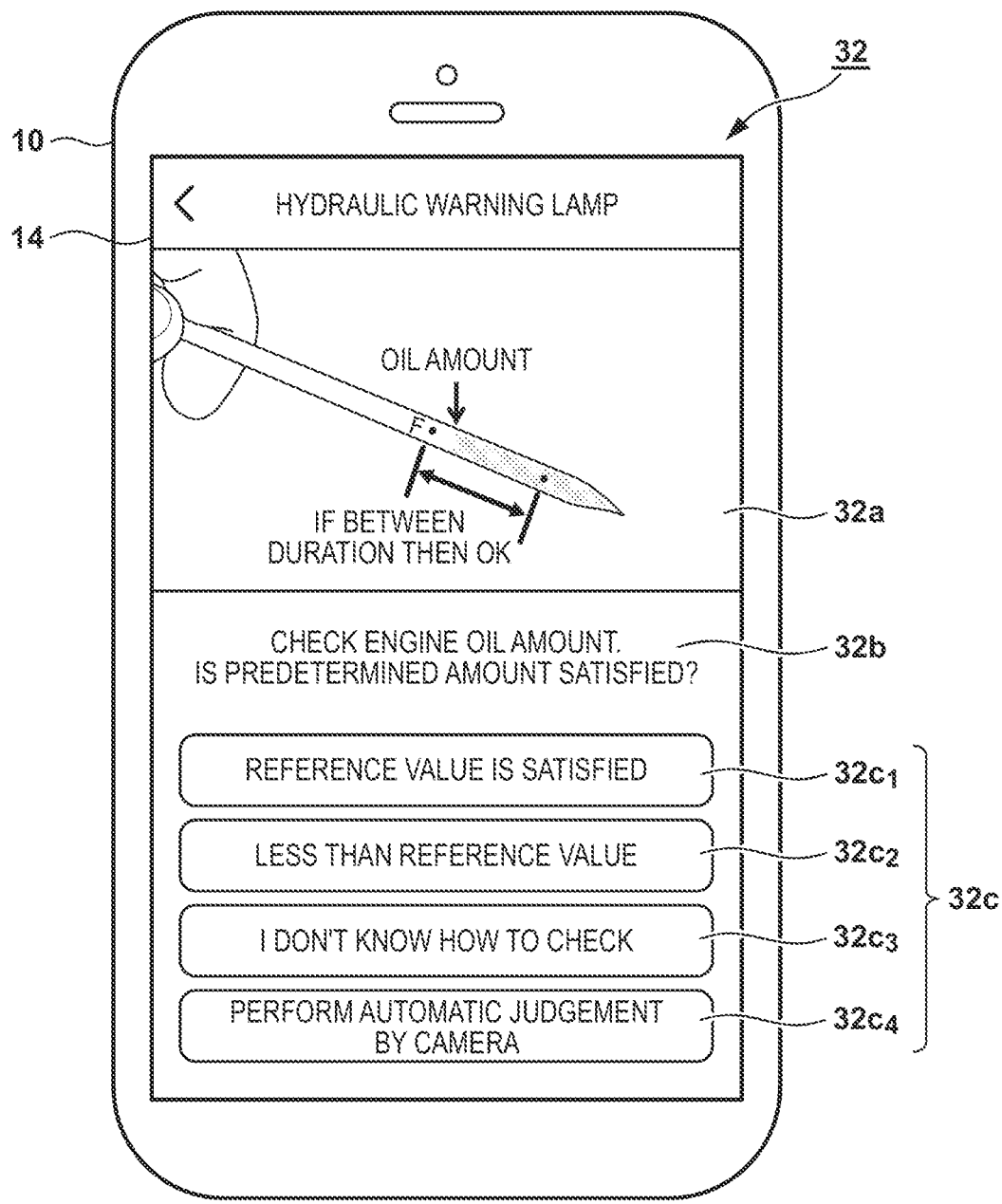
FIG. 6 is a diagram illustrating a procedure screen for giving an instruction for an investigation of the engine oil amount.

In S22, the processing unit 11 (display control unit 11d) displays a procedure screen 32 (first procedure screen) for giving an instruction for an investigation of the engine oil amount as a content of coping procedure on the display 14 as illustrated in FIG. 6. The procedure screen 32 illustrated in FIG. 6 can include, for example, a description field 32a of a reference value of the engine oil, a comment 32b including an instruction for an investigation of the engine oil amount and a question as to whether the reference value is satisfied or not, and a plurality of answer items 32c. The plurality of answer items 32c are configured with selection buttons selectable by the user, and the user can answer the procedure (question) by touching any one of the plurality of answer items 32c on the display 14.

Here, the plurality of answer items 32c on the procedure screen illustrated in FIG. 6 include answer items for answering the state of the object, and answer items for answering the state of the user. In the present embodiment, the "state of the object" refers to the state of the engine oil (i.e., whether the engine oil amount satisfies the reference value or not), and an answer item 32c1 indicating that "reference value is satisfied", and an answer item 32c2 indicating that "less than reference value" are provided as the answer items. Moreover, the "state of the user" refers to the comprehension level of the user, and an answer item 32c3 indicating that "I don't know how to check", and an answer item 32c4 indicating that "perform automatic judgement by camera" are provided as the answer items. As described above, by simultaneously displaying answer items regarding the state of the object and answer items regarding the state of the user on the same procedure screen, it is possible to quickly lead the user to solve the problem and to provide appropriate information suitable for individual users having different knowledge.

In S23, the processing unit 11 determines which of the "state of the object" and the "state of the user" has been answered. Specifically, the processing unit 11 determines whether an answer item for answering the state of an object has been selected or an answer item for answering the state of the user has been selected. The processing proceeds to S24 in a case where there is an answer regarding the state of an object. On the other hand, the process proceeds to S30 in the flowchart of FIG. 2C in a case where there is an answer regarding the state of the user. Each step in the flowchart of FIG. 2C will be described later.

In S24, the processing unit 11 determines which of answer items for answering the "state of the object" has been answered. Specifically, the processing unit 11 determines whether an answer item 32c1 for answering that "reference value is satisfied" has been selected or an answer item 32c2 for answering that "less than reference value" has been selected. The processing proceeds to S25 in a case where there is an answer that "reference value is satisfied", or proceeds to S29 in a case where there is an answer that "less than reference value".

Figure 7:
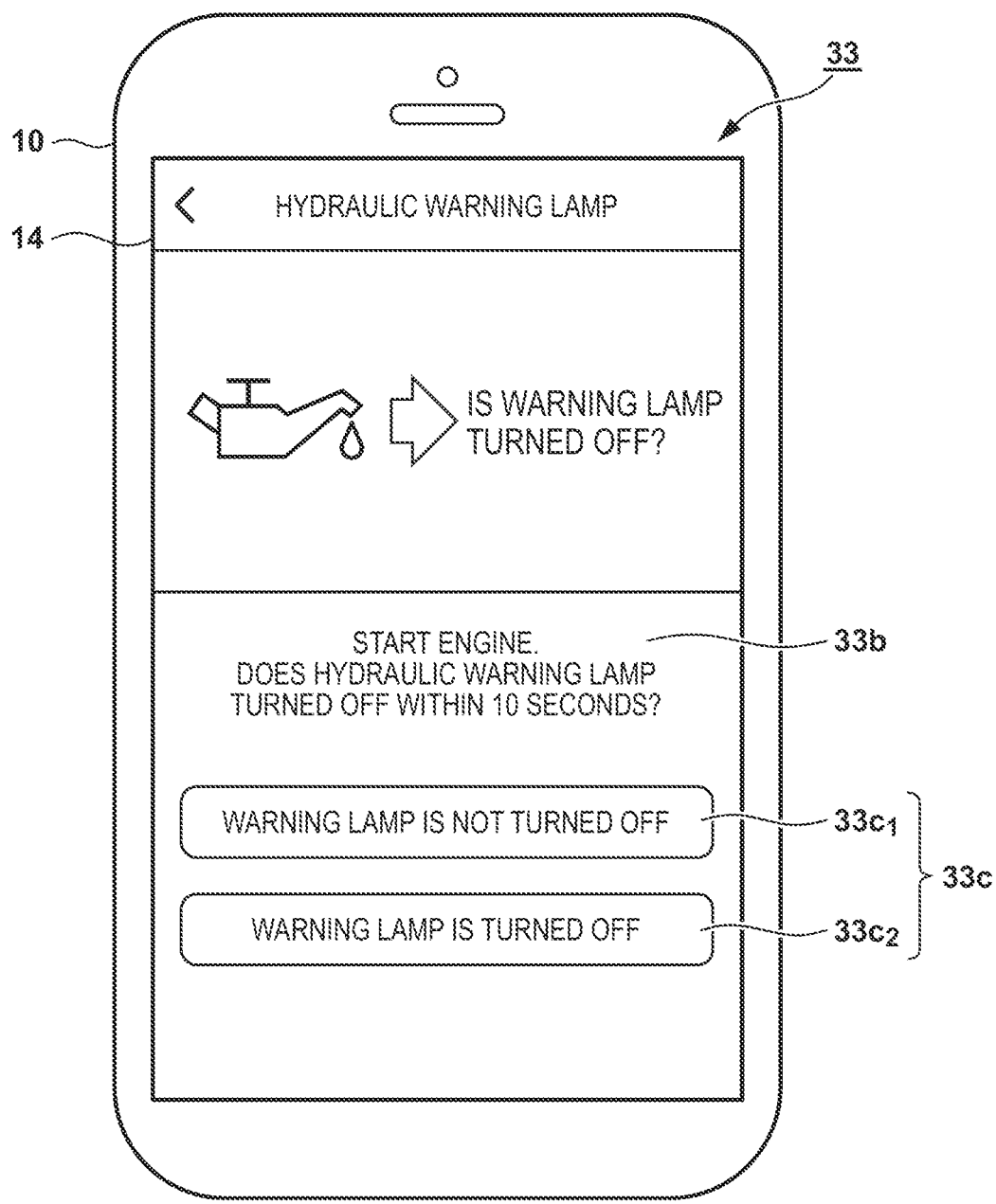
FIG. 7 is a diagram illustrating a procedure screen for giving an instruction for starting of an engine.

In S25, the processing unit 11 (display control unit 11d) displays a procedure screen 33 for giving an instruction for starting of the engine as a content of coping procedure on the display 14 as illustrated in FIG. 7. The procedure screen illustrated in FIG. 7 can include, for example, a comment 33b including an instruction for starting of the engine and a question as to whether the hydraulic warning lamp has been turned off or not, and a plurality of answer items 33c. The plurality of answer items 33c are configured with selection buttons selectable by the user, and the user can answer the procedure (question) by touching any one of the plurality of answer items 33c on the display 14. In the example illustrated in FIG. 7, an answer item 33c1 that "warning lamp was not turned off", and an answer item 33c2 that "warning lamp was turned off" are provided.

Figure 8:
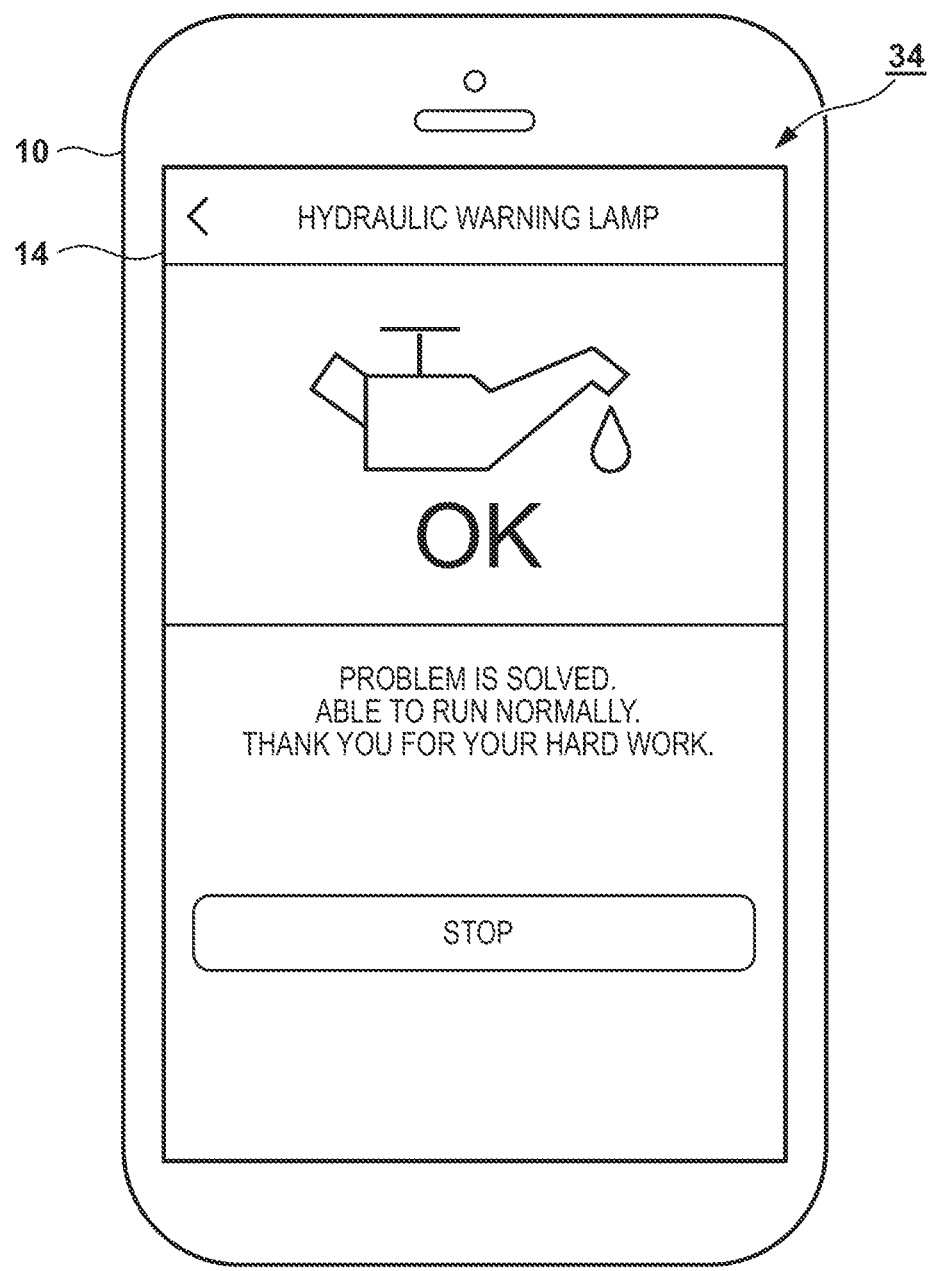
FIG. 8 is a diagram illustrating a screen indicating that a problem has been solved.

In S26, the processing unit 11 determines whether an answer item 33c1 that "warning lamp was not turned off" has been selected or an answer item 33c2 that "warning lamp was turned off" has been selected. In a case where an answer of "warning lamp was turned off" is made, the processing proceeds to S27, and a screen 34 indicating that the problem has been solved is displayed on the display 14 as illustrated in FIG. 8. On the other hand, in a case where an answer of "warning lamp was not turned off" is made, the processing proceeds to S28.

Figure 9:
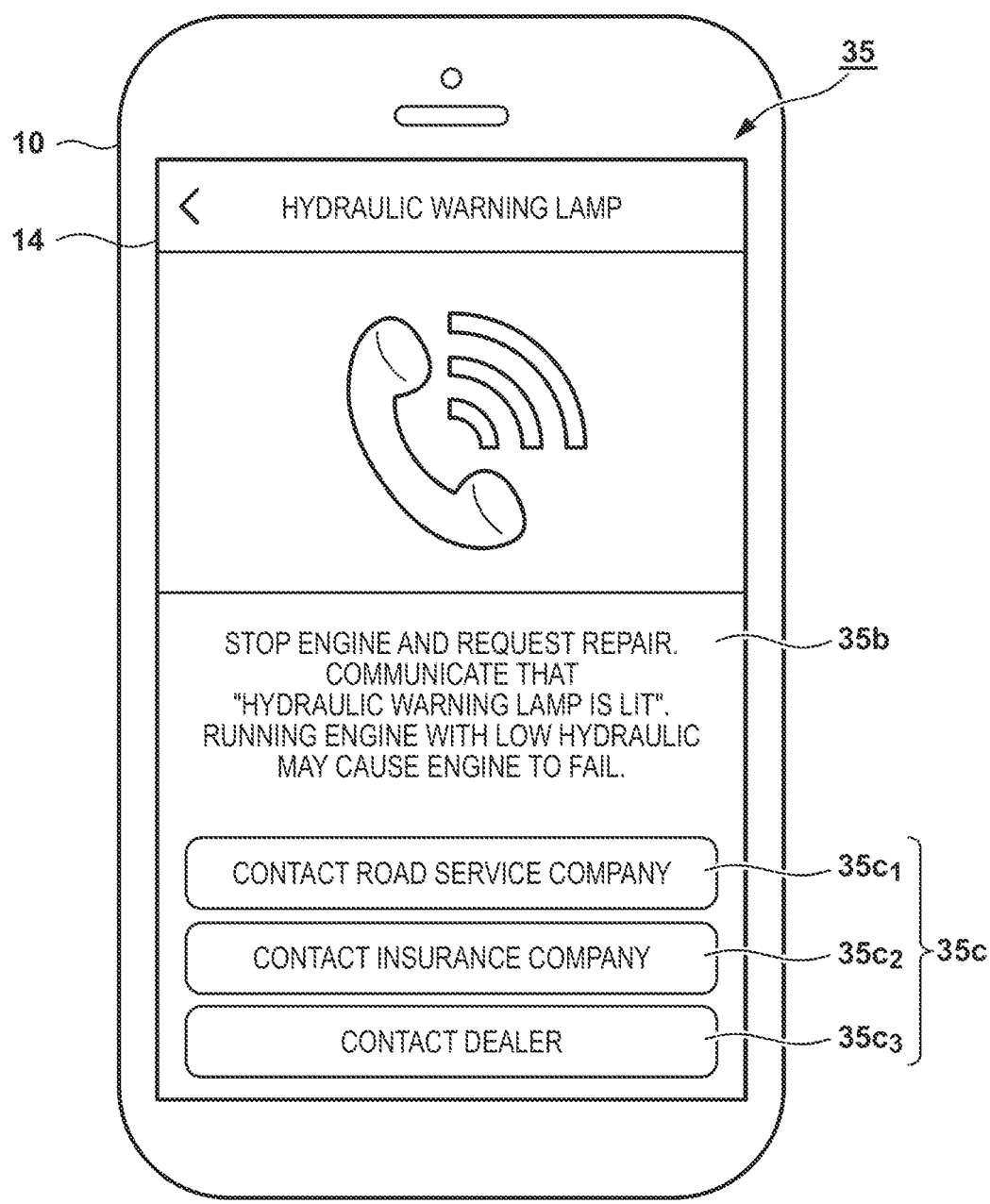
FIG. 9 is a diagram illustrating a procedure screen for requesting support.

In S28, the processing unit 11 (display control unit 11d) displays a procedure screen 35 for requesting support as a content of coping procedure on the display 14 as illustrated in FIG. 9. The procedure screen illustrated in FIG. 9 can include, for example, a comment 35*b* regarding a repair request and a call for attention, and a plurality of selection items 35*c* regarding contacts. Each of the plurality of selection items 35*c* is associated with a contact (e.g., telephone number) registered in advance, and the user can call a corresponding contact by touching any one of the plurality of selection items 35*c* on the display 14. In the example illustrated in FIG. 9, a selection item 35*c*1 of "contact road service company", a selection item 35*c*2 of "contact insurance company", and a selection item 35*c*3 of "contact dealer" are provided.

Figure 10:
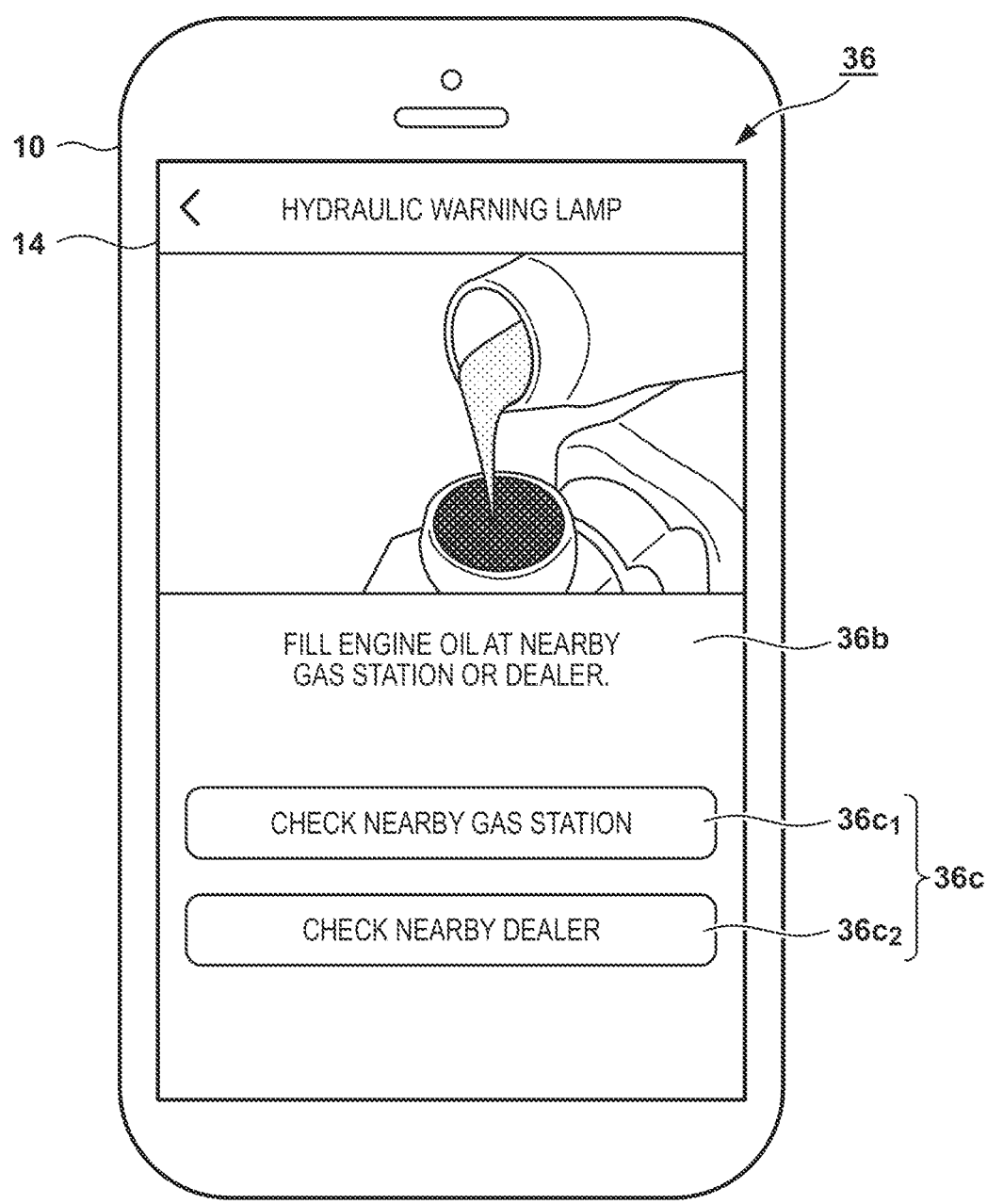
FIG. 10 is a diagram illustrating a procedure screen for giving an instruction for replenishment of engine oil.

In S29 to which the processing proceeds when an answer of "less than reference value" has been made in S24, the processing unit 11 displays a procedure screen 36 for giving an instruction for replenishment of the engine oil on the display 14 as a content of the coping procedure as illustrated in FIG. 10. The procedure screen illustrated in FIG. 10 can include, for example, a comment 36*b* giving an instruction for replenishment of the engine oil, and a plurality of selection items 36*c* regarding facilities where the engine oil can be replenished. In the example illustrated in FIG. 10, a selection item 36*c*1 of "check nearby gas station", and a selection item 36*c*2 of "check nearby dealer" are provided. When any of the selection items is touched on the display 14, the screen moves to a website for searching for a gas station or a dealer, and information (e.g., map information) indicating the position of a gas station or a dealer close to the current position of the information terminal 10 is displayed on the display 14.

Next, processing to be performed in a case where an answer regarding the state of the user is made in S23 (No in S23) will be described with reference to the flowchart in FIG. 2C.

In S30, the processing unit 11 determines which of answer items for answering the "state of the user" has been answered. Specifically, the processing unit 11 determines whether an answer item 32*c*3 indicating "I don't know how to check" has been selected or an answer item 32*c*4 indicating "perform automatic judgement by camera" has been selected. The processing proceeds to S31 in a case where an answer indicating "I don't know how to check" is made, or proceeds to S33 in a case where an answer indicating "perform automatic judgement by camera" is made.

Figure 11:
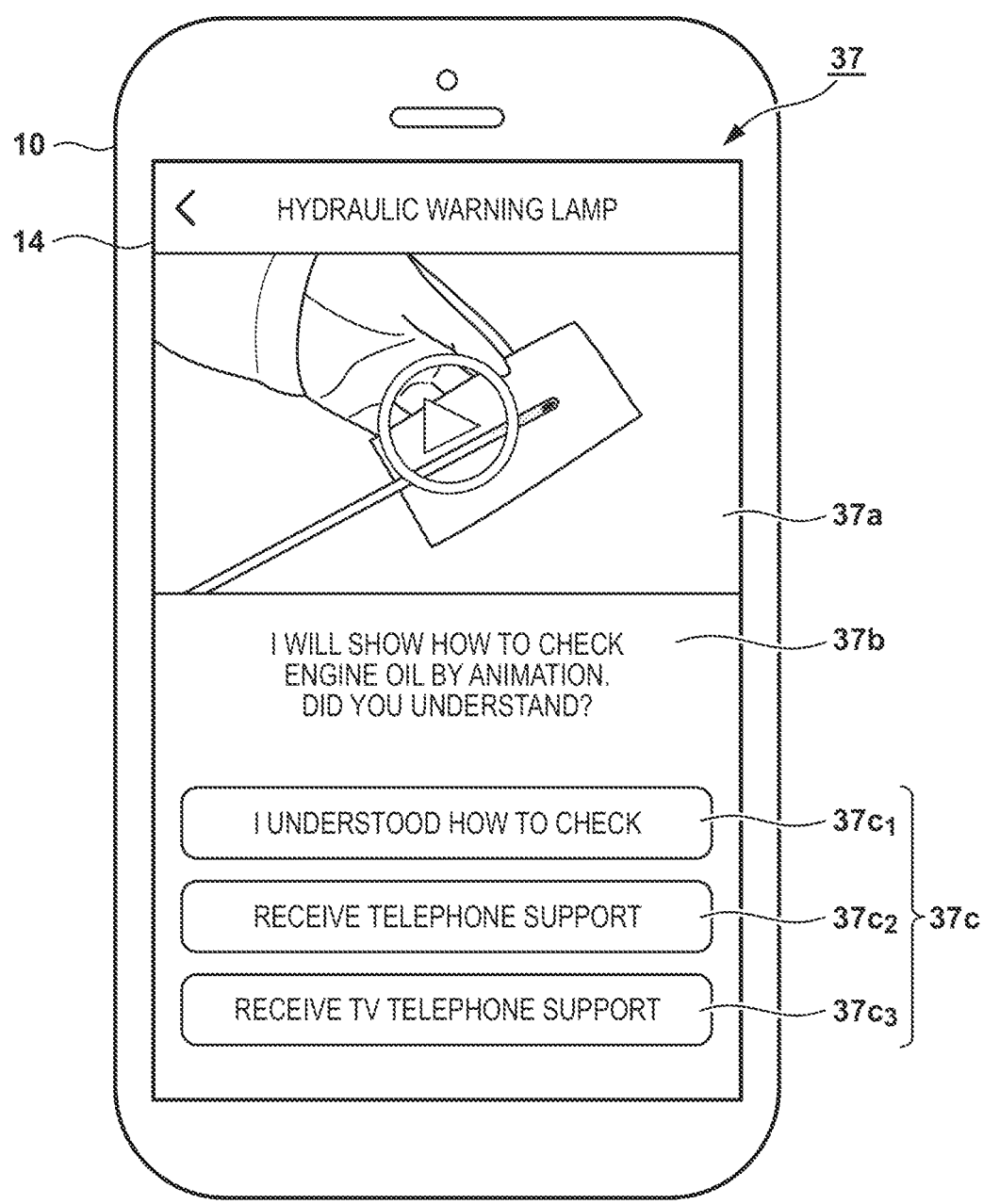
FIG. 11 is a diagram illustrating a procedure screen indicating how to check the engine oil amount in an animation.

In S31, the processing unit 11 (display control unit 11*d*) displays a procedure screen 37 showing how to check the engine oil amount in an animation as a content of coping procedure on the display 14 as illustrated in FIG. 11. The procedure screen 37 illustrated in FIG. 11 can include, for example, a display field 37*a* for displaying an animation of how to check the engine oil amount, a comment 37*b* including a question as to whether how to check has been understood or not, and a plurality of answer items 37*c*. The plurality of answer items 37*c* are configured with selection buttons selectable by the user, and the user can answer the procedure (question) by touching any of the plurality of answer items 37*c* on the display 14. In the example illustrated in FIG. 11, an answer item 37*c*1 regarding "I understood how to check", an answer item 37*c*2 regarding "receive telephone support", and an answer item 37*c*3 regarding "receive TV (television) telephone support" are provided.

In S32, the processing unit 11 determines whether the answer item 37*c*1 of "I understood how to check" has been selected, the answer item 37*c*2 of "receive telephone support" has been selected, or the answer item 37*c*3 of "receive TV telephone support" has been selected. The processing proceeds to S22 in the flowchart illustrated in FIG. 2B in a case where an answer regarding "I understood how to check" has been made. On the other hand, the processing proceeds to S28 in the flowchart illustrated in FIG. 2B in a case where an answer regarding "receive telephone support" has been made. Here, in the "telephone support", it is necessary to convey or ask a problem area, an item (information) the user wants to know, and the like to a third party such as a dealer only by voice, and it may be difficult to smoothly explain the situation or acquire how to check. Therefore, in the present embodiment, an answer item 37*c*3 of "receive TV telephone support" is provided on the procedure screen 37, so that it is possible to make a TV call with a management center by using the photographing function (camera 13) of the information terminal 10 in a case where the answer item 37*c*3 is selected. The management center can be, for example, a dealer, but may be any institution capable of coping with a problem area, and information such as a telephone number is set in the information terminal 10 in advance. For example, the user can receive appropriate support from the management center by photographing a problem area or an item that the user wants to know with the camera 13 of the information terminal 10, and transmitting the image from the information terminal 10 to the management center. Moreover, since the management center can appropriately grasp the situation, it is possible to provide the user with appropriate support.

In S33 to which the processing proceeds when an answer regarding "perform automatic judgement by camera" is made in S30, the processing unit 11 (display control unit 11*d*) displays a procedure screen for giving an instruction to extract the oil level gauge and capture an image by the camera 13 on the display 14. In S34, the processing unit 11 (determination unit 11*e*) identifies the oil level gauge in the captured image displayed on the display 14 (display field), and identifies the attachment region of the engine oil in the oil level gauge. For example, the processing unit 11 can identify the oil gauge and the attachment region of the engine oil by performing known image processing.

In S35, the processing unit 11 (determination unit 11*e*) determines whether the upper limit position of the attachment region of the engine oil satisfies a reference value or not on the basis of the result of the image processing in S34. The processing proceeds to S25 in the flowchart illustrated in FIG. 2B in a case where it is determined that the reference value is satisfied. On the other hand, the processing proceeds to S28 in the flowchart illustrated in FIG. 2B in a case where it is determined that the reference value is not satisfied.

As described above, the information provision system 100 according to the present embodiment displays answer items regarding the state of an object and answer items regarding the state of the user on the procedure screen (e.g., procedure screen 32 illustrated in FIG. 6) indicating a content of the procedure for coping with the problem area. As a result, it is possible to quickly lead the user to solve the problem and to provide appropriate information suitable for individual users having different knowledge.

Other Embodiments

In the above embodiment, the processing unit 11 may measure a time required to cope with the problem area by the measurement unit 11*f* and change the content of the screen 34 indicating that the problem has been solved in accordance with the time measured by the measurement unit 11*f*. For example, the screen 34 illustrated in FIG. 8 includes a comment of "Thank you for your hard work". However, the comment may be displayed when the time measured by the measurement unit 11*f* exceeds a threshold, or the content of the comment may be changed. Moreover, the time data measured by the measurement unit 11*f* may be transmitted to the server device 20 via the communication unit 17 and stored in the server device 20 (storage unit 22). In this case, since the dealer or the like can evaluate the validity or convenience of the procedure content in the coping information on the basis of the time required for the user to cope with the problem area, it is possible to further improve the coping information.

Moreover, in the above embodiment, the intention of the user confirmed on the confirmation screen 31 may be transmitted to the server device 20 via the communication unit 17 and stored in the server device 20 (storage unit 22). In this case, since the dealer or the like can grasp the correspondence between the problem area and existence of the intention of the user and evaluate the validity or convenience of the procedure content in the coping information, it is possible to further improve the coping information.

Moreover, in the above embodiment, the server device 20 may receive an answer from the user to a procedure (question) from the information terminal 10, and store the answer in the storage unit 22 in association with the procedure (question). In this case, the information regarding the answer from the user can be transmitted to, for example, the creator (i.e., service provider) of the information provision program. As a result, the creator can improve the information provision program so as to further improve convenience by grasping (collecting) an item that the user has coped with, an item that the user could not cope with, and the like, and inserting a matter desired by the user or detailing an item that the user could not cope with, for example. Furthermore, the creator can improve the information provision program so as to further improve convenience by grasping (collecting) information regarding the comprehension level of the user on the state or situation using the information provision program and constructing a more suitable item, for example.

Moreover, in the above embodiment, the processing unit 11 may acquire user information registered in advance from the server device 20 by the second acquisition unit 11*b*, and change the procedure screen 35 (FIG. 9) for requesting support in accordance with the user information. For example, in a case where information on a plurality of insurance companies is registered as the user information, contacts of the plurality of insurance companies may be displayed on the procedure screen 35, or a contact of an insurance company that can solve the identified problem area at a lower cost may be displayed on the procedure screen 35. In a case where information on a dealer from which the user has purchased the vehicle or a person in charge thereof is registered as the user information, the contact thereof may be displayed on the procedure screen 35.

Moreover, in the above embodiment, the processing unit 11 may change the contents of the procedure screen displayed on the display 14 in accordance with the remaining fuel amount or the remaining power amount to be supplied to the drive source (engine or motor) of the vehicle. For example, in a case where the processing unit 11 is configured to be able to communicate with the vehicle via the network NTW, the processing unit acquires information regarding the remaining fuel amount or the remaining power amount from the vehicle, and determines whether the vehicle can reach a nearby gas station or dealer with the remaining fuel amount or the remaining power amount or not. In a case where it is determined that the vehicle cannot reach a nearby gas station or dealer with the remaining fuel amount or the remaining power amount, a procedure screen 35 (FIG. 9) for requesting support may be displayed on the display 14 instead of the procedure screen 36 (FIG. 10) for requesting oil replenishment. As a result, it is possible to avoid a situation that fuel shortage occurs without reaching a nearby gas station or dealer, and to provide a user with more suitable information (proposal).

Summary of Embodiments

1. An information provision system of the above embodiments is
an information provision system (e.g., 100) that provides a user with information for coping with a problem by using an information terminal (e.g., 10) having a camera (e.g., 13) and a display (e.g., 14),
in which the information terminal includes:
identification means (e.g., 11*c*) that identifies a problem area in a captured image obtained by the camera; and
display control means (e.g., 11*d*) that suitably displays a plurality of procedure screens (e.g., 32 to 37) indicating contents of a procedure for coping with the problem area identified by the identification means on the display in accordance with an answer from the user,
the plurality of procedure screens include a first procedure screen (e.g., 32) on which a plurality of answer items (e.g., 32*c*) selectable by the user are displayed as answers to the procedure, and
the plurality of answer items include an answer item (e.g., 32*c*1 to 32*c*2) regarding a state of an object and an answer item (e.g., 32*c*3 to 32*c*4) regarding a state of the user.

It becomes possible with this configuration to quickly lead the user to solve the problem and to provide appropriate information suitable for individual users having different knowledge.

2. In the information provision system of the above embodiments,
the problem area includes at least one of an article in an abnormal state different from a normal state, or a notification sign indicating that the article is in an abnormal state.

It becomes possible with this configuration to provide appropriate information suitable for individual users not only when an article in an abnormal state is identified as a problem area, but also when a notification sign indicating that the article is in an abnormal state is identified as a problem area.

3. In the information provision system of the above embodiments,
an answer item regarding a state of the user includes an answer item (e.g., 32*c*3) regarding a comprehension level of the user on the procedure.

It becomes possible with this configuration to provide the user with appropriate information suitable for the comprehension level of the user on the procedure.

4. In the information provision system of the above embodiments,
the information terminal includes determination means (e.g., 11*e*) that makes a determination regarding the procedure on the basis of a captured image obtained by the camera, and
the answer item regarding a state of the user includes an answer item (e.g., 32*c*4) that causes the determination means to make a determination regarding the procedure.

It becomes possible with this configuration to provide the user with appropriate information suitable for individual users even when the comprehension level of the user on the procedure or the determination ability is low.

5. In the information provision system of the above embodiments, the display control means displays a confirmation screen (e.g., 31) for confirming whether the user has an intention to cope with the problem area by himself/herself or not to the user on the display.

It becomes possible with this configuration to provide the user with appropriate information suitable for the intention of the user. That is, it is possible to quickly guide a user who has no intention to cope with the problem area by himself/herself toward requesting another person to solve the problem, while it is possible to allow a user who has the intention to try to solve the problem by himself/herself, thereby allowing the user to have a sense of accomplishment after the problem is solved and a feeling of commitment associated therewith.

6. In the information provision system of the above embodiments, the display control means changes a procedure screen displayed on the display in accordance with a result of confirmation of whether the user has an intention to cope with the problem area by himself/herself or not to the user on the confirmation screen.

It becomes possible with this configuration to provide the user with appropriate information suitable for the intention of the user.

7. In the information provision system of the above embodiments, the number of procedure screens suitably displayed on the display in a case where it is confirmed on the confirmation screen that the user has an intention to cope by himself/herself is larger than the number of procedure screens suitably displayed on the display in a case where it is confirmed that the user has no intention to cope by himself/herself.

It becomes possible with this configuration to gently provide procedures of coping to a user who has an intention to cope with the problem area by himself/herself, and to allow the user to cope with the problem area more appropriately and quickly.

8. In the information provision system of the above embodiments, the information terminal includes measurement means (e.g., 110 that measures a time required to cope with the problem area, and the display control means changes a content of a screen displayed on the display after the problem area is coped with, in accordance with the time measured by the measurement means.

It becomes possible with this configuration to make a response such as displaying words expressing gratitude to the user on the display in accordance with the time required to cope with the problem area, and therefore, it becomes possible to allow the user to have a greater sense of accomplishment.

9. In the information provision system of the above embodiments, the information terminal includes acquisition means (e.g., 11*b*) that acquires user information registered in advance, and the display control means changes a content of a procedure screen displayed on the display, in accordance with the user information acquired by the acquisition means.

It becomes possible with this configuration to provide a user with more convenient information (proposal) in accordance with individual users by, for example, displaying the contact of an insurance company that can solve the problem area at a lower cost on the display in a case where contacts of a plurality of insurance companies are registered as user information, for example.

10. In the information provision system of the above embodiments, the problem area is a part of a vehicle, and the display control means changes a content of a procedure screen displayed on the display, in accordance with a remaining fuel amount or a remaining power amount to be supplied to a drive source of the vehicle.

It becomes possible with this configuration to avoid a situation that fuel shortage occurs before reaching a nearby gas station or dealer, for example, and to provide a user with more suitable information (proposal).

11. In the information provision system of the above embodiments, a server device communicably connected with the information terminal is further provided, and the server device has a storage unit that stores an answer from the user.

It becomes possible with this configuration to grasp (collect) information regarding the comprehension level of the user on the state or situation, and to provide an information provision system with further improved convenience.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An information provision system that provides a user with information for coping with a problem by using an information terminal having a camera and a display, wherein
   the information terminal includes at least one processor with a memory comprising instructions, that when executed by the at least one processor, cause the at least one processor to at least:
      identify a problem area in a captured image obtained by the camera; and
      display, on the display, a plurality of procedure screens indicating contents of a procedure for coping with the identified problem area, in accordance with an answer from the user,
   the plurality of procedure screens include a first procedure screen on which a plurality of answer items selectable by the user are displayed as answers to the procedure,
   the plurality of answer items include an answer item regarding a state of an object and an answer item regarding a state of the user, and
   the at least one processor is configured to measure a time required to cope with the problem area, and change a content of a screen displayed on the display after the problem area is coped with, in accordance with the measured time.

2. The information provision system according to claim 1, wherein the problem area includes at least one of an article in an abnormal state different from a normal state, or a notification sign indicating that the article is in an abnormal state.

3. The information provision system according to claim 1, wherein the answer item regarding a state of the user includes an answer item regarding a comprehension level of the user on the procedure.

4. The information provision system according to claim 1, wherein
the at least one processor is configured to perform a determination regarding the procedure on the basis of a captured image obtained by the camera, and
the answer item regarding a state of the user includes an answer item that causes the at least one processor to perform the determination regarding the procedure.

5. The information provision system according to claim 1, wherein the at least one processor is configured to display, on the display, a confirmation screen for confirming whether the user has an intention to cope with the problem area by himself/herself or not to the user.

6. The information provision system according to claim 5, wherein the at least one processor is configured to change a procedure screen displayed on the display in accordance with a result of confirmation of whether the user has an intention to cope with the problem area by himself/herself or not to the user on the confirmation screen.

7. The information provision system according to claim 5, wherein the number of procedure screens suitably displayed on the display in a case where it is confirmed on the confirmation screen that the user has an intention to cope by himself/herself is larger than the number of procedure screens suitably displayed on the display in a case where it is confirmed that the user has no intention to cope by himself/herself.

8. The information provision system according to claim 1, wherein the at least one processor is configured to
acquire user information registered in advance, and
change a content of a screen displayed on the display, in accordance with the acquired user information.

9. The information provision system according to claim 1, wherein
the problem area is a part of a vehicle, and
the at least one processor is configured to change a content of a procedure screen displayed on the display, in accordance with a remaining fuel amount or a remaining power amount to be supplied to a drive source of the vehicle.

10. The information provision system according to claim 1, further comprising a server device communicably connected with the information terminal,
wherein the server device has a storage unit that stores an answer from the user.

11. The information provision system according to claim 1, wherein the at least one processor is configured to:
display, on the display, a confirmation screen for confirming whether the user has an intention to cope with the problem area by himself/herself or not to the user;
start, in a case of confirming on the confirmation screen that the user has an intention to cope by himself/herself, displaying the plurality of procedure screens on the display.

12. An information terminal that has a camera and a display and provides a user with information for coping with a problem,
the information terminal comprising at least one processor with a memory comprising instructions, that when executed by the at least one processor, cause the at least one processor to at least:
identify a problem area in a captured image obtained by the camera; and
display, on the display, a plurality of procedure screens indicating contents of a procedure for coping with the identified problem area, in accordance with an answer from the user
wherein the plurality of procedure screens include a first procedure screen on which a plurality of answer items selectable by the user are displayed as answers to the procedure,
wherein the plurality of answer items include an answer item regarding a state of an object and an answer item regarding a state of the user, and
wherein the at least one processor is configured to measure a time required to cope with the problem area, and change a content of a screen displayed on the display after the problem area is coped with, in accordance with the measured time.

13. An information provision method of providing a user with information for coping with a problem by using an information terminal having a camera and a display, the information provision method comprising:
identifying a problem area in a captured image obtained by the camera; and
displaying, on the display, a plurality of procedure screens indicating contents of a procedure for coping with the identified problem area, in accordance with an answer from the user,
wherein the plurality of procedure screens include a first procedure screen on which a plurality of answer items selectable by the user are displayed as answers to the procedure,
wherein the plurality of answer items include an answer item regarding a state of an object and an answer item regarding a state of the user, and
wherein a time required to cope with the problem area is measured, and a content of a screen displayed on the display after the problem area is coped with is changed in accordance with the measured time.

* * * * *